United States Patent [19]

Rosenmund et al.

[11] 4,081,381
[45] Mar. 28, 1978

[54] FILTERING APPARATUS

[75] Inventors: Peter Rosenmund; Hans Brodbeck, both of Liestal, Switzerland

[73] Assignee: Rosenmund AG, Liestal, Switzerland

[21] Appl. No.: 616,422

[22] Filed: Sep. 24, 1975

[51] Int. Cl.² .............................................. B01D 25/38
[52] U.S. Cl. .................................... 210/408; 210/409; 210/414
[58] Field of Search ................ 210/348, 412, 406–409, 210/411, 413, 415, 106, 108, 138, 141, 143, 414

[56] References Cited

U.S. PATENT DOCUMENTS

| | | | |
|---|---|---|---|
| 679,875 | 8/1901 | Blaisdell | 210/415 X |
| 1,574,557 | 2/1926 | Coe | 210/413 X |
| 1,865,061 | 6/1932 | Grob | 210/413 X |
| 2,014,945 | 9/1935 | Mayer | 210/415 X |
| 2,102,385 | 12/1937 | Schock | 210/415 X |
| 2,404,215 | 7/1946 | Cavanaugh | 210/415 X |
| 2,603,354 | 7/1952 | Way et al. | 210/413 X |
| 2,641,536 | 6/1953 | Upton | 210/415 X |
| 2,899,068 | 8/1959 | King et al. | 210/407 X |

Primary Examiner—Frank W. Lutter
Assistant Examiner—Richard L. Chiesa
Attorney, Agent, or Firm—Lowe, King, Price & Markva

[57] ABSTRACT

An industrial filtering apparatus in which the filter cake can be removed automatically by scraping layers of solid from the cake with paring devices which are associated with screw conveyors for transporting the solid to the center of the housing and depositing it in a removal pipe. The mouth of the removal pipe through which the cake falls is completely unobstructed by structural members. The paring devices can also be used in a different mode to smooth out cracks and compact the cake. There is also an independent revolving device for breaking up the cake which can be used in conjunction with a sprinkler head to ensure particularly intensive and intimate washing and slurrying of the cake. The paring device, its associated screw conveyors and the removal pipe can be raised and lowered, as can the device for breaking up the cake, thus making adjustment to any filter cake thickness possible.

11 Claims, 8 Drawing Figures

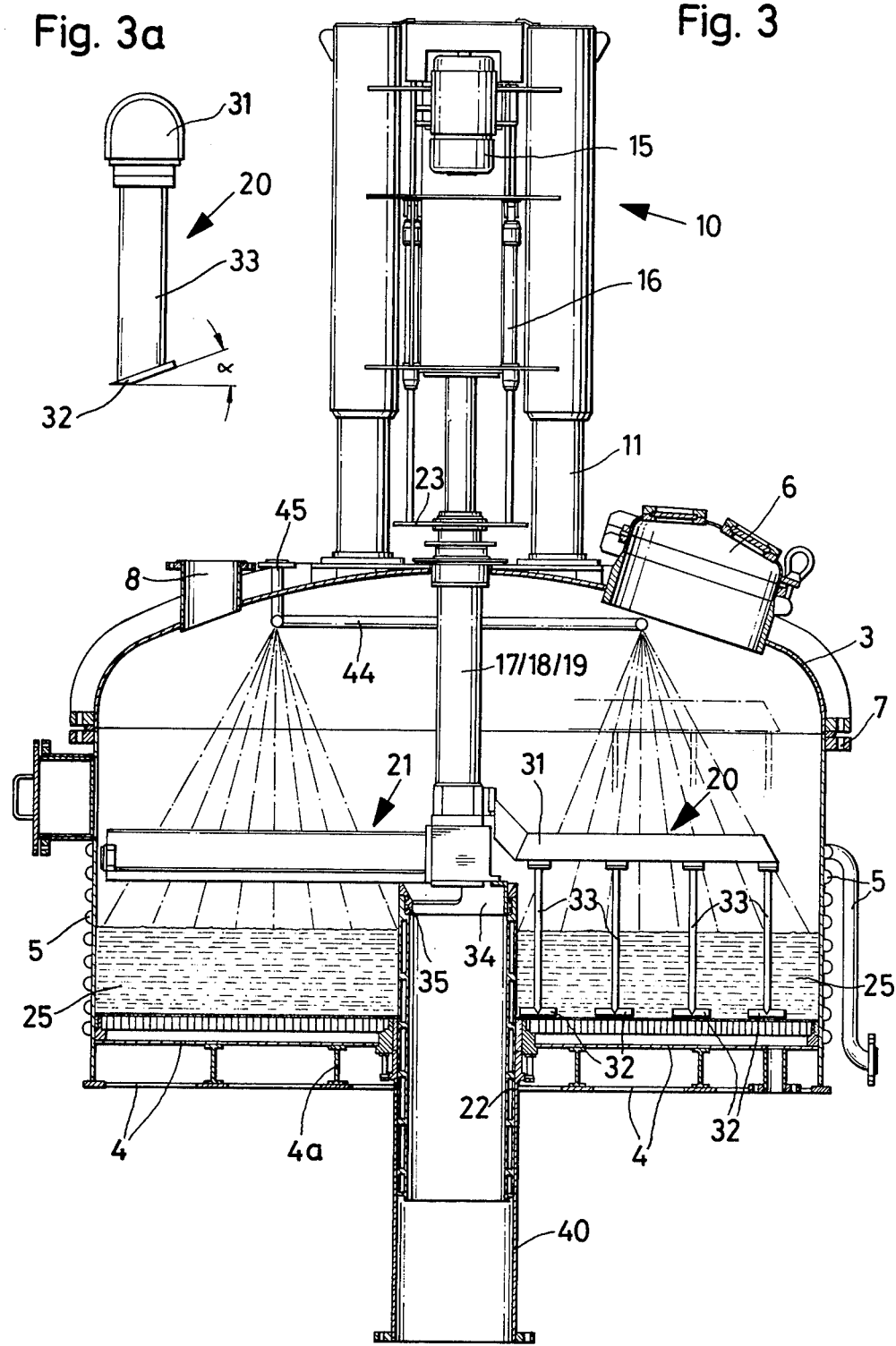

FILTERING APPARATUS

BACKGROUND OF THE INVENTION

The invention concerns a filtering apparatus for the industrial, discontinuous separation of solids from liquids and in which the filter cake is removed automatically. The apparatus includes a housing, a filtering element support which is mounted within the housing and has a filtering element, an inlet opening for the suspension to be filtered, a discharge opening for the filtrate, and a device for removing the filter cake which comprises at least one screw conveyor. The screw conveyor, which may be a cut-flight screw conveyor, a spiral screw conveyor or a ribbon screw conveyor for instance, conveys the filter cake which accumulates on the filtering element towards the cake removal opening in the center of the housing floor. A hollow shaft which can be raised and lowered is mounted coaxially with the vertical main axis of the filtering apparatus. The upper end of the hollow shaft is rigidly fixed to a drive and the lower end to the screw conveyor or conveyors and the drive shaft for the conveyor members is mounted within this hollow shaft. The lower end of the drive shaft is coupled to the conveyor members via a bevel gear.

The types of filtering apparatus of this kind hitherto known in the art have several shortcomings some of which are briefly outlined below.

As soon as the filter cake reaches a certain state of dryness, cracks which penetrate down to the filter form over the whole of its surface. On account of these cracks the vacuum or pressure is impaired and the rate of filtration falls. These cracks must be continuously smoothed out in order to keep the filtration time of open suction filters within economic limits. This is naturally a laborious and time-consuming procedure.

Another significant disadvantage of known filtering apparatus of this kind is that although efficient conveyor members are present to remove the filter cake, the removal opening however is to a large extent obstructed by elements, for instance those holding the removal pipe. The situation is not conducive to the rapid removal of the filter cake.

It is also impossible with conventional filtering apparatus to break up the solid cake into small pieces quickly and thoroughly after the first filtration and then to wash it. With many products, however, it is essential to wash the solid cake once or several times.

SUMMARY OF THE INVENTION

These and other disadvantages have been overcome by the present invention in which a removal pipe is mounted so that it can move vertically in the removal opening. The upper section of the removal pipe is suspended from the end of the hollow shaft by means of at least two suspension members which do not obstruct the mouth of the removal pipe near the delivery ends of the screw conveyors and are attached to a circulating-ring which is mounted so that it can rotate on the inner surface of the removal pipe. In addition, two pairs of hydraulic cylinders which act in opposite directions are mounted on the housing. One pair of hydraulic cylinders acts on the hollow shaft and on the drive shaft which, together with the removal pipe, can be raised and lowered with the hollow shaft. The other pair of hydraulic cylinders acts on a second hollow shaft, to the lower end of which at least one device for breaking up the filter cake is attached.

This novel construction enables the filter cake to be removed rapidly and automatically, resulting in a remarkably short filtration time and a sharp reduction in residual moisture. The slurrying and washing process can be carried out in a very short time and may be repeated as many times as required.

BRIEF DESCRIPTION OF DRAWINGS

The following description, which is to be read in conjunction with the accompanying drawing depicting an illustratory embodiment of the object of the invention, demonstrates further advantages of the invention.

FIG. 1a is a section along the line Ia —Ia in FIG. 1, FIG. 3 is another vertical section showing the filtering apparatus in its second operational phase, FIG. 3a shows the arm of one of the devices for breaking up the filter cake.

DESCRIPTION OF SPECIFIC EMBODIMENTS

Figure 1:
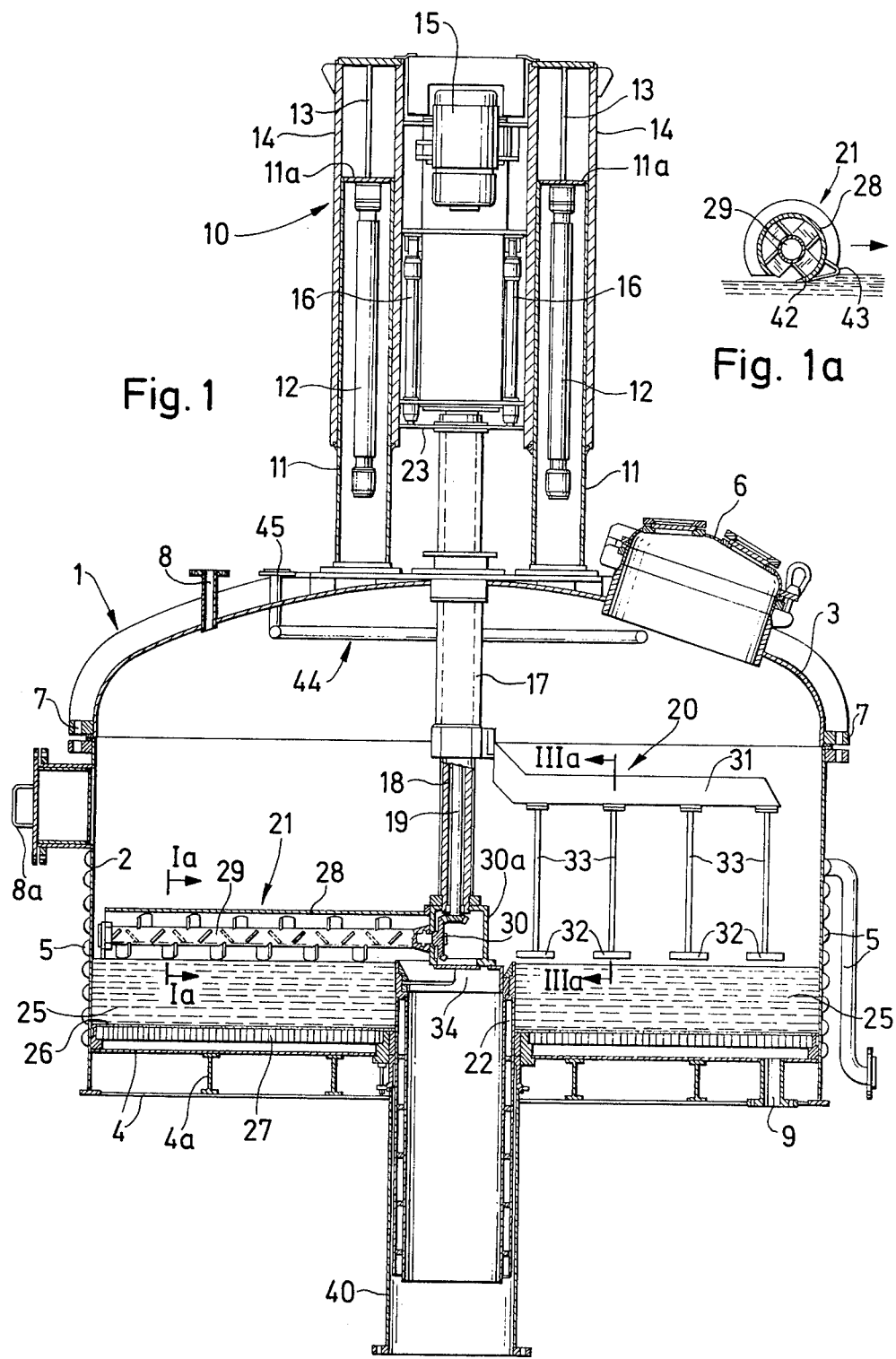
FIG. 1 is a simplified vertical section of this embodiment and shows the filtering apparatus in the first phase of its operation.

The filtering apparatus shown schematically and omitting non-essential details in FIG. 1 comprises a housing 1 having a cylindrical wall 2, a cover 3 and a double floor 4 reinforced with struts 4a. A cooling or heating coil 5 is wound round the cylindrical wall 2. The cover 3 is removable and bolted onto flanges 7 so as to make a pressure-tight seal with the wall 2. The cover 3 also has a man-hole 6 and an inlet pipe 8 for the mother liquor to be filtered. Other devices can be mounted on the housing, for instance a connecting pipe 8a. These devices however are of secondary importance in the present context. The filtrate is discharged to an opening 9 in the floor 4.

A lifting and drive unit designated as a whole by 10 is mounted on the cover 3. This unit 10 has a supporting frame 11 which is securely fixed to the cover. Two hydraulic cylinders 12 are suspended from the horizontal cross-pieces 13 of the frame 11 and the hydraulically driven piston in each cylinder 12 acts via a rod 13 on a sliding carriage 14 mounted so that it can move up and down at the edge of the supporting frame 11. Both the supporting frame 11 and the carriage 14 have annular cross-sections and the carriage 14 can be raised and lowered together, with all the parts suspended from it, by the hydraulic cylinders 12. These parts suspended from the carriage 14 essentially comprise two drive motors 15, a second, somewhat smaller hydraulic unit with two hydraulic cylinders 16, three drive shafts 17, 18 und 19 disposed concentrically with respect to each other, a two-armed device 20 for breaking up the filter cake and two cut-flight screw conveyors 21 and a filter cake removal pipe 22.

Figure 2:
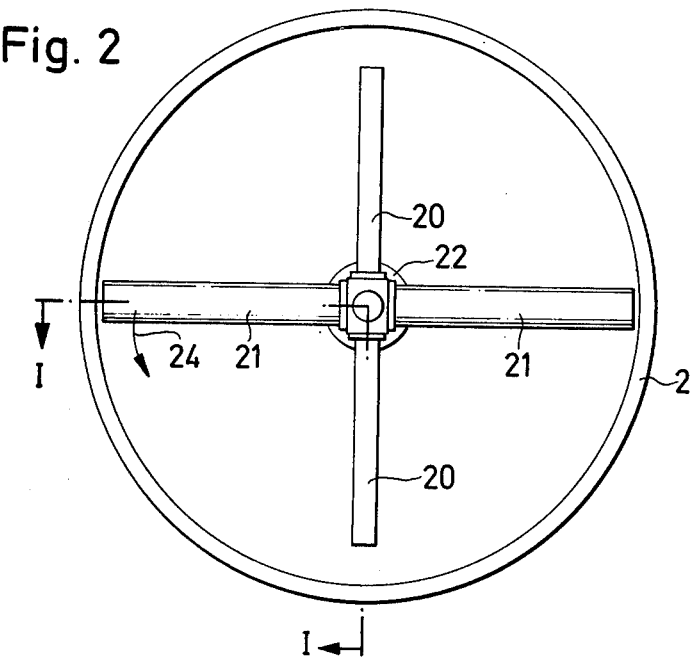
FIG. 2 is a schematic plan view of the devices for removing and breaking up the filter cake.

Before these parts are considered in detail, it should be noted that the sectional representation of the filtering apparatus in FIG. 1 corresponds to a vertical plane bent through 90° along the central main axis of the apparatus in order that both the screw conveyor 21 and one of the arms off the two-armed device 20 for breaking up the cake can be shown on the same figure. The section thus follows the line I—I in FIG. 2 and the screw conveyor 21 in fact lies at an angle of 90° with respect to the device for breaking up the filter cake 20. The hollow shaft 18 is driven by the motor 15. This hollow shaft 18 and the shaft 19 mounted concentrically within it provide the drive to the two screw conveyors 21. The inner ends of the casings 28 of the screw conveyors 21 are therefore secured to the hollow shaft 18 and rotate above the filter cake 25 in the direction indicated by arrow 24 in FIG. 2 when smoothing down the filter cake. When the cake is being removed or slurried the hollow shaft 18 together with its associated devices, rotates in the opposite direction. The filter cake 25 is supported on a filter 26 by a laminiform filter support 27 which contains numerous bore-holes. The revolving screws 29 in the screw conveyors 21 are coupled to the central drive shaft 19 by a right angle bevel gear 30 and are therefore driven by shaft 19 in mutually opposite rotational directions.

The two devices 20 for breaking up the filter cake are attached to the outer hollow shaft 17 which is linked to the hollow shaft 18 in such a way that mutual rotation is impossible. The two hydraulic cylinders 16 enable the devices 20 for breaking up the filter cake to be raised and lowered. Each of these devices 20 has an arm 31 from which four rods 33 project downwards. At the lower end of each rod 33 there is a blade 32 (FIG. 3a) inclined at an angle α to the horizontal. The angle α lies preferably between 10° and 25° and in a special variant it is 20°.

Figure 5:
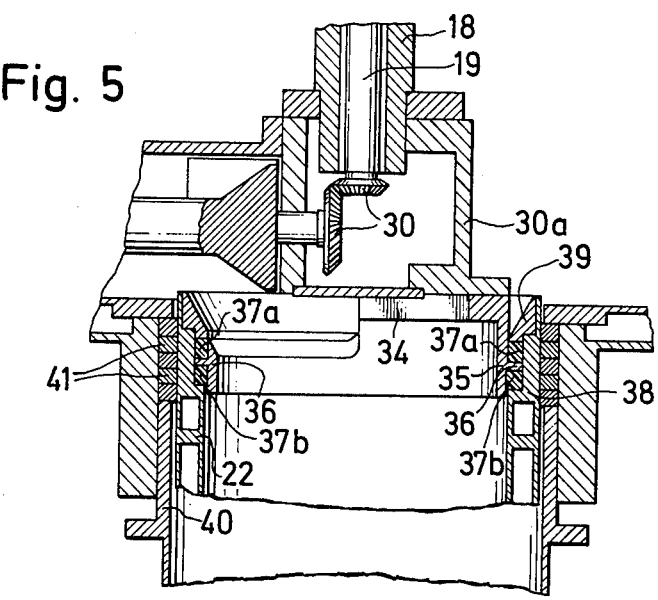
FIG. 5 illustrates the way in which the removal pipe is suspended from the hollow shaft of the screw conveyor drive.

The filter cake removal pipe 22 is suspended from the gear box 30a which is fixed to the hollow shaft 18 and rotates with the shaft. This removal pipe 22, through which the solid cake 25 is removed from the housing 1, is intended on the one hand to rise and fall with the hollow shaft 18 and the screw conveyors 21. Thus the mouth of the removal pipe 22 is always at approximately the level of the upper surface of the solid cake 25. On the other hand, the removal pipe 22 may not rotate with the hollow shaft 18 so that the continuous removal of the filter cake transported by the screw conveyors 21 is not affected so that unnecessary wear is avoided. The construction shown on a longer scale in FIG. 5 and described below meets these requirements. The removal pipe 22 is connected to the underside of the gear box 30a by at least two, and preferably three, stays 34 which are bolted or welded onto the floor plate of the gear box, the other ends of the stays 34 being firmly attached to a circulating-ring 35. The circulating-ring 35 has an annular supporting shoulder 36 which projects radially outwards into a recess between two plastic rings 37a/37b mounted on the inside of the wall of the removal pipe 22. The lower plastic ring 37b rests on the shoulder 38 of the removal pipe while the upper plastic ring 37a is held in position by a cover ring 39. This arrangement enables the circulating-ring 35 to rotate relative to the removal pipe 22, but the latter does not have to rotate with the hollow drive shaft 18. A protective pipe 40 surrounding the removal pipe 22 serves at the same time as the stuffing box gland for the stuffing box 41.

The two rotating shafts 18 and 19 are driven directly by motor 15 or by another motor, not shown, mounted on the opposite side, and can be raised and lowered together with the screw conveyors 21, the device 20 for breaking up the filter cake and the removal pipe 22 by the two hydraulic cylinders 12 so that allowance can be made for the varying height of the filter cake 25. The hollow shaft 17, which drives the device 20 for breaking up the filter cake, is itself driven via a key by hollow shaft 18 and can be raised and lowered relative to the two other shafts 18/19 via plate 23 by the hydraulic cylinders 16, and thus the height of the blades 32 above the filter floor is also adjustable.

Figure 4:
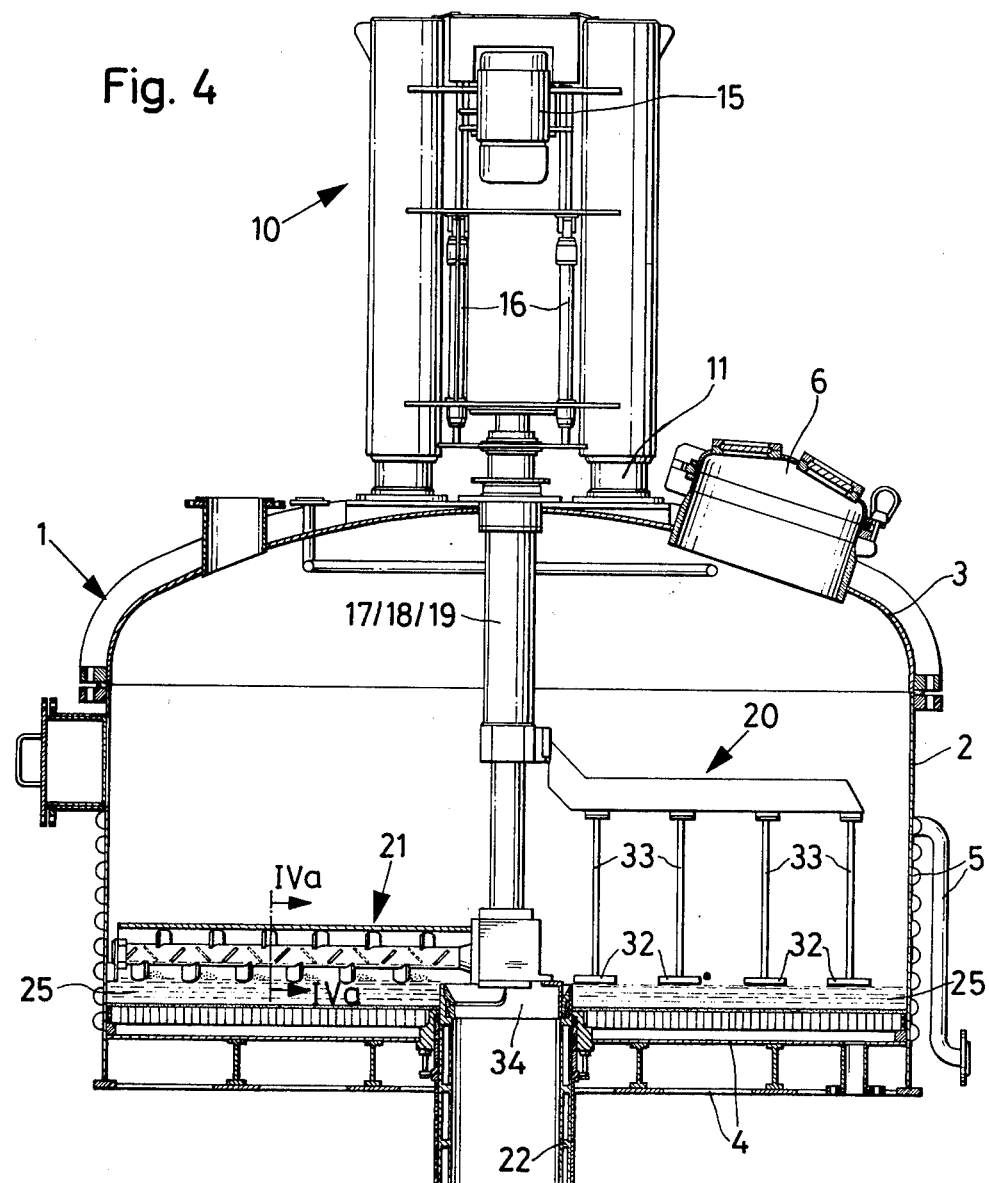
FIG. 4 illustrates with a vertical section the third operational phase of the filtering apparatus.
Figure 4A:
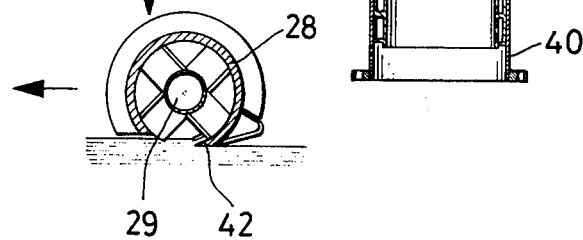
FIG. 4a is a section along the line IVa —IVa in FIG. 4.

As shown in FIGS. 1a and 4a, the lower side of each screw conveyor 21 is open and has a paring edge 42 for lifting the solid cake away layer by layer (of FIG. 4a). On the other side of the casing 28 from the paring edge 42 there is a smoother 43, the purpose of which is to smooth out cracks in the filter cake.

A spray device 44 is arranged in the upper part of the housing 3 and can be connected to a water conduit via a connecting pipe 45. This device 44 can be designed as a ring-shaped sprinkler head for instance.

The filtering apparatus described works as follows.

After the removal pipe 22 has been raised by the hydraulic cylinders 12, the mother liquor is introduced through connecting pipe 8. In this position the removal pipe 22 prevents the mother liquor from flowing out so that the filtrate must pass through the filtering medium 26 and subsequently flow away through opening 9. By creating a vacuum below or an overpressure above the filter, the filtering process can be made to progress more rapidly, the solid cake 25 remaining behind as a residue on the filter 26.

As soon as cracks appear on the surface of the filter cake, the two screw conveyors 21 are lowered to the level of the cake by the hydraulic cylinders 12 and rotated in the smoothing direction. The cracks are thus smoothed over by the downwards-facing, inclined face of the smoother 43 (FIG. 1a) and at the same time the filter cake is compacted somewhat. The height of the screw conveyors 21 and thus also the smoothers 43 is adjusted through appropriate control of the hydraulic cylinders 12.

If it is necessary to wash the filter cake, washing liquid can be sprayed onto the filter cake through the spray device 44. The filter cake can be washed or slurried particularly effectively by using the spray device 44 and the device 20 for breaking up the cake together. In order to do this hollow shaft 17 and the device 20 for breaking up the cake are lowered down to the filter cake, and then rotated while slowly lowering them further downwards.

The blades 32 dig into the filter cake (FIG. 3a) and loosen it so that the wash is particularly intensive and intimate. This slurry process is depicted in FIG. 3.

On completion of the filtering process the direction of rotation of the screw conveyors 21 is reversed and the motor which drives the screws 29, which in this embodiment are cut-flight screws, is switched on. The screw conveyors are simultaneously slowly lowered by the hydraulic cylinders 12, so that the solid cake is lifted away by the paring edge 42, as shown in FIG. 4a, and fed to the screw 29 inside the casing 28. The two conveyor screws 29 convey the material in the radial direction towards the center of the filtering apparatus where it falls into the removal pipe 22. It is particularly important in this respect that the upper mouth of the removal pipe 22 presents an unobstructed opening of large internal diameter in order that the filter cake can be removed unchecked. The removal of the filter cake by the conveyor screws 29 is shown in FIG. 4 of the drawing.

A special embodiment is described below in which the suspension to be filtered is produced in a reaction vessel situated over the filtering apparatus.

The contents of the reaction vessel, i.e. the suspension to be filtered, consisting of solid and liquid components are introduced batchwise into the filtering apparatus. As already mentioned, the mechanical separation of the solids from the liquid is carried out with the aid of pressure or a vacuum, and filter cloths, metal wire cloth or porous stone can be used as the filtering medium. As the filtrate, that is to say the liquid component of the suspension, flows away through the filtrate discharge pipe 9 the so-called filter cake forms on this filtering medium. In order that as much mother liquor as possible is expelled from the filter cake the cake is continuously smoothed flat by the smoother attached to the main hollow shaft. This operation simultaneously squeezes out more liquid by virtue of the pressure exerted on the cake and can further reduce the residual moisture by about 25 to 30%. Smoothing the filter cake flat ensures that no dry cracks develop, and that the vacuum or pressure can exert its optimum effect.

Traces of mother liquor, however, still remain in the filter cake and these must be washed out before processing the solids further. The wash can be carried out in two different ways.

In the first type of wash, termed a displacement wash, the washing liquid is sprayed evenly onto the filter cake from a ring-shaped sprinkler and pushed or sucked through the cake by the pressure or vacuum respectively, the washing liquid displacing the remaining traces of mother liquor and emerging again from the filtering apparatus.

The second type of wash is an intensive and intimate diffusion wash in which the washing liquid is again sprayed onto a filter cake 25 from the ring-shaped sprinkler 44. After adding the washing liquid however the filter cake 25 is brought into intimate contact with the washing liquid by using the devices 20 for breaking up the cake, pressure conditions remaining normal and the filtrate discharge duct 9 closed, and all the crystals are throughly washed. After a certain length of time, the devices 20 for breaking up the cake are lifted and brought to a halt and the washing liquid sucked off.

On completion of this washing process the filter cake appears again and is then compacted once more with the smoother in order to expel as much as possible of the washing liquid from the filter cake. After this smoothing process, the filter cake is dried by passing a heated gas through the cake, enabling the residual moisture to be considerably reduced. After this drying phase, the direction of rotation of the smoother is changed. As already described, the smoother now acts as a paring edge and peels off layers of the filter cake (see FIG. 4 and 4a), which are transported to the removal pipe 22 by the screw conveyors 21. The supporting stays 34, by which the removal pipe 22 is suspended from the rotating gear box 30a, rotate with the screw conveyors 21. The supporting stays 34 are of course mounted in positions between the mouths of the two screw conveyors so that the removal of the filter cake can proceed quite unimpeded.

All these operations are controlled from a central control desk. The whole cycle can be controlled automatically, e.g. by using a cyclic program or by a computer.

We claim:
1. A filtering apparatus for the industrial discontinuous separation of solids from liquids whereby the solids are accumulated on a filter element to form a filter cake which is removed automatically, said apparatus comprising:
   (a) a housing having a floor and a central axis,
   (b) means for mounting the filter element inside the housing,
   (c) inlet means on one side of the filter element for introducing mother liquor to be filtered,
   (d) outlet means on the other side of the filter element to discharge the filtrate,
   (e) a filter cake removal opening positioned in the center of the housing floor,
   (f) means for removing the solids of the filter cake out of the housing,
   (g) said solids removing means being mounted to move for adjustment to the thickness of the filter cake,
   (h) said solids removing means including conveyor means mounted to rotate about the central axis for conveying the solids from the filter cake toward the removal opening and removal pipe means mounted to move within the removal opening,
   (i) said removal pipe means having a mouth fixedly disposed adjacent the conveyor means to receive said filter cake solids,
   (j) means for sealing between the removal opening and the movably disposed removal pipe means to prevent the mother liquor from flowing out therebetween, and
   (k) hollow shaft means is mounted for up and down movement coaxially with the vertical main axis of the filtering apparatus,
   (l) said conveyor means and an upper section of said removal pipe means being fixedly secured to the hollow shaft means,
   (m) said removal pipe means upper section being suspended from the lower end section of the hollow shaft via at least two suspension members which do not obstruct the mouth of the removal pipe means near the delivery end of the conveyor means.

2. The filtering apparatus as defined in claim 1 wherein
   said conveyor means includes at least one screw conveyor,
   hollow shaft means is mounted for up and down movement coaxially with the vertical main axis of the filtering apparatus,
   the upper end of the hollow shaft being rigidly fixed to a drive means and the lower end being rigidly fixed to the screw conveyor to rotate the screw conveyor around the central axis of the housing.

3. The filtering apparatus as defined in claim 2 wherein
   a drive shaft is mounted within the hollow shaft and drivingly connected to the screw conveyor.

4. The filtering apparatus as defined in claim 2 wherein
   means for breaking up the filter cake is mounted on the hollow shaft means to be raised, lowered, and rotated with respect to the filter element to dig into the filter cake.

5. The filtering apparatus as defined in claim 1 wherein said suspension members are attached to a circulating ring rotatably mounted on the inner surface of the removal pipe means.

6. The filtering apparatus as defined in claim 5 wherein
the suspension members are supporting stays which rigidly connect the circulating ring to the base of a gear box mounted on said hollow shaft.

7. The filtering apparatus as defined in claim 5 wherein
the circulating ring has an annular supporting shoulder which projects radially outwardly into a recess between two stationary plastic rings mounted on the inside of the wall of the removal pipe means.

8. The filtering apparatus as defined in claim 1 wherein
said conveyor means includes two screw conveyors mounted opposite to each other and projecting radially outwardly from the main axis of the filtering apparatus, and
said solids removing means includes means for breaking up the filter cake having two arms projecting also radially outwardly from the main axis of the filtering apparatus at an angle of 90° to the two screw conveyors and further including a row of rods projecting downwardly from each arm.

9. The filtering apparatus defined in claim 8 wherein the lower end of each rod has a blade which is inclined to the horizontal in such a way that its leading edge is lower than the trailing edge so that side blades dig down into the filter cake and tear it up when the filter cake breaking up means are rotated and simultaneously lowered.

10. The filtering apparatus as defined in claim 9 wherein
a sprinkler device is mounted inside the housing above the filter cake breaking up means.

11. A filtering apparatus for the industrial discontinuous separation of solids from liquids whereby the solids are accumulated on a filter element to form a filter cake which is removed automatically, said apparatus comprising:
(a) a housing having a floor,
(b) means for mounting the filter element inside the housing,
(c) inlet means on one side of the filter element for introducing mother liquor to be filtered,
(d) outlet means on the other side of the filter element to discharge the filtrate,
(e) a filter cake removal opening positioned in the center of the housing floor,
(f) means for removing the solids of the filter cake out of the housing,
(g) said solids removing means being mounted to move for adjustment to the thickness of the filter cake,
(h) said solids removing means including conveyor means for conveying the solids from the filter cake toward the removal opening and removal pipe means mounted to move within the removal opening,
(i) said removal pipe means having a mouth fixedly disposed adjacent the conveyor means to receive said filter cake solids, and
(j) means for sealing between the removal opening and the movably disposed removal pipe means to prevent the mother liquor from flowing out therebetween,
(k) hydraulic means which act in opposite directions are mounted on the housing to effect the adjustable movement for the solids removing means,
(l) said conveyor means includes at least one screw conveyor,
(m) a first hollow shaft is mounted for up and down movement coaxially with the vertical main axis of the filtering apparatus,
(n) the upper end of the hollow shaft being rigidly fixed to a drive means and the lower end of first hollow shaft being rigidly fixed to the screw conveyor,
(o) a drive shaft is mounted within the first hollow shaft and drivingly connected to the screw conveyor,
(p) said hydraulic means includes two pairs of hydraulic cylinders,
(q) one pair of hydraulic cylinders acts on the first hollow shaft and drive shaft to be raised and lowered,
(r) whereby the removal pipe means in its raised condition prevents the mother liquor from flowing into said mouth and out through said removal pipe means and by lowering the removal pipe means the filter cake solids are discharged therethrough via the screw conveyor,
(s) the other pair of hydraulic cylinders act on a second hollow shaft mounted coaxially with the first hollow shaft, and
(t) filter cake breaking up means are disposed at the lower end of the second hollow shaft.

* * * * *